(12) United States Patent
Green et al.

(10) Patent No.: US 8,985,592 B2
(45) Date of Patent: Mar. 24, 2015

(54) SYSTEM FOR SEALING A GAP BETWEEN A TRANSITION AND A TURBINE

(75) Inventors: Andrew G. Green, Jupiter, FL (US); Daniel R. Leggett, Winter Springs, FL (US); Sachin R. Shinde, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 386 days.

(21) Appl. No.: 13/359,578

(22) Filed: Jan. 27, 2012

(65) Prior Publication Data

US 2012/0200046 A1   Aug. 9, 2012

Related U.S. Application Data

(60) Provisional application No. 61/439,988, filed on Feb. 7, 2011.

(51) Int. Cl.

| | |
|---|---|
| *F16J 15/02* | (2006.01) |
| *F16J 15/08* | (2006.01) |
| *F01D 9/02* | (2006.01) |
| *F01D 11/00* | (2006.01) |
| *F01D 11/02* | (2006.01) |

(52) U.S. Cl.
CPC ............ *F16J 15/0887* (2013.01); *F01D 9/023* (2013.01); *F01D 11/005* (2013.01); *F01D 11/02* (2013.01); *F05D 2240/57* (2013.01)
USPC ............................ 277/637; 277/644; 415/190

(58) Field of Classification Search
CPC ......... F16J 15/02; F16J 15/022; F16J 15/024; F16J 15/027; F16J 15/061; F16J 15/062; F16J 15/08; F01D 9/023; F01D 11/005; F05D 2240/57; F23R 3/46; F23R 2900/00012
USPC .......... 277/630, 637, 644, 647, 650, 653, 654; 60/39.37, 52; 415/134, 135, 189–190, 415/209.2–209.4, 214.1

See application file for complete search history.

(56) References Cited

U.S. PATENT DOCUMENTS

| | | | |
|---|---|---|---|
| 5,265,412 A | 11/1993 | Bagepalli et al. | |
| 6,347,508 B1 * | 2/2002 | Smallwood et al. | ............ 60/796 |
| 6,450,762 B1 * | 9/2002 | Munshi | ......................... 415/138 |
| 6,619,915 B1 * | 9/2003 | Jorgensen | ..................... 415/138 |
| 6,637,752 B2 * | 10/2003 | Aksit et al. | ..................... 277/416 |
| 6,675,584 B1 * | 1/2004 | Hollis et al. | .................... 60/796 |
| 6,834,507 B2 | 12/2004 | Jorgensen | |
| 6,854,738 B2 * | 2/2005 | Matsuda et al. | .............. 277/632 |
| 7,090,224 B2 * | 8/2006 | Iguchi et al. | .................. 277/603 |
| 7,178,340 B2 | 2/2007 | Jorgensen | |
| 7,246,995 B2 * | 7/2007 | Zborovsky | .................... 415/137 |

(Continued)

*Primary Examiner* — Vishal Patel

(57) ABSTRACT

A system (10) is provided for sealing a gap (12) between a transition exit frame (14) and a vane rail (18) at a turbine inlet (20). The system includes a seal (11) with a compliant seal member having a generally u-shaped profile to provide a sealing function in an axial direction. The compliant seal member includes a U-shaped inner sheet (28) securely pressed within a U-shaped outer sheet (26). The outer and inner sheets include spaced-apart segments (30, 32) in a lateral direction which are spaced-apart by misaligned slots (36, 38) to block passage of air there through. The system may also include wear resistant material (62) interposed between the seal and the vane rail. A lateral gap between adjacent exit frames may include a plurality of ribs defining valleys and tips, with crushable material disposed between the valleys and tips.

13 Claims, 6 Drawing Sheets

(56) References Cited

U.S. PATENT DOCUMENTS

| | | |
|---|---|---|
| 7,527,469 B2 | 5/2009 | Zborovsky et al. |
| 7,784,264 B2 * | 8/2010 | Weaver et al. ............... 60/39.37 |
| 7,797,948 B2 | 9/2010 | Weaver et al. |
| 7,798,768 B2 | 9/2010 | Strain et al. |
| 2006/0127219 A1 * | 6/2006 | Zborovsky .................... 415/229 |
| 2010/0061837 A1 * | 3/2010 | Zborovsky et al. .......... 415/58.4 |

* cited by examiner

SYSTEM FOR SEALING A GAP BETWEEN A TRANSITION AND A TURBINE

CROSS-REFERENCE TO RELATED APPLICATIONS

This application claims the benefit of U.S. Provisional Application No. 61/439,988, which was filed on Feb. 7, 2011.

FIELD OF THE INVENTION

Aspects of the invention are related to turbine engines, and more particularly, to a seal for a gap between a transition and a turbine.

BACKGROUND OF THE INVENTION

In gas turbine engines, air is compressed at an initial stage, is subsequently heated in combustion chambers, and the hot gas so produced passes to a turbine that, driven by the hot gas, does work which may include rotating the air compressor.

In a typical industrial gas turbine engine, a number of combustion chambers combust fuel. Hot gas flowing from these combustion chambers is passed via respective transitions (also referred to as ducts or transition pieces) to respective inlets of the turbine. More specifically, a plurality of combustion chambers are commonly arranged radially about a longitudinal axis of the gas turbine engine, and likewise radially arranged transitions respectively include outlet ends that converge to form an annular inflow of hot gas to the turbine inlet. Each transition outlet is joined by a seal to a vane rail of a row 1 vane segment at the turbine inlet. Adjacent component growth variances due to thermal expansion, thermal stresses, and vibrational forces from combustion dynamics all affect design criteria and performance of such a seal. Consequently, the design of such a seal has presented a challenge that resulted in various approaches that attempt to find a suitable balance between seal cost, reliability, durability, installation and repair ease, performance, and affect on adjacent components.

FIG. 1 provides a schematic cross-sectional depiction of a prior art gas turbine engine 100. The gas turbine engine 100 includes a compressor 102, a combustion chamber 108 (such as a can-annular combustion chamber), and a turbine 110. During operation, in axial flow series, the compressor 102 takes in air and provides compressed air to a diffuser 104, which passes the compressed air to a plenum 106 through which the compressed air passes to the combustion chamber 108, which mixes the compressed air with fuel (not shown), providing combusted gases via a transition 114 to the turbine 110, which may generate electricity. A shaft 112 is shown connecting the turbine 110 to drive the compressor 102. Air from the compressor 102 also travels to the turbine 110 by various channels (not shown in FIG. 1) to provide higher pressure air that surrounds and may enter the hot gas path as it passes through the turbine 110. A gap between the transition 114 and the turbine 110 is indicated by 115, and is the subject of further discussion herein.

FIG. 2 provides a cross-sectional view of the gap 115 between a transition exit frame 116 and a vane rail 132 of a row 1 vane segment 130 of a turbine inlet. FIG. 2 depicts prior art inner and outer seals 120, 122 along a respective inner and outer diameter section of the exit frame 116, to join the exit frame 116 to the vane rail 132 of a row 1 vane segment 130. The row 1 vane segment 130 includes a single airfoil 134 and is supported along an inner wall 136 by an inner vane attachment structure 140 and at a downstream outer end by an outer vane attachment structure 142 that connects to a row 1 turbine blade ring 144. The vane rail 132 of the row 1 vane segment 130 includes a respective lip 138, 139 that engages a slot 121, 123 in the respective inner and outer seals 120, 122. Each slot 121, 123 provides for axial movement and limited radial movement.

Various designs of the conventional seal 120, 122 have been developed, such as a heavy seal design, which has an inherently large mass/inertia, and may cause wear to the exit rail 116 and adjacent components, when the heavy seal is excited by dynamic forces during engine operation between the exit rail 116 and the vane rail 132. Similarly, a conventional thin seal design has been developed, with an inherently small mass/inertia, which despite reducing the likelihood of excessive wear to adjacent components, may wear at an excessive rate, due to direct abrasive contact with an inherently hard superalloy material used to form the vane rail 132 of the row 1 vane segment 130.

Thus, it would be advantageous to provide a seal for the gap between the transition exit frame and the vane rail, which avoids the shortcomings of the conventional designs of the heavy seal and the thin seal.

BRIEF DESCRIPTION OF THE DRAWINGS

The invention is explained in the following description in view of the drawings that show:

FIG. 2 is a cross-sectional view of the gap of a prior art interface of a transition exit frame with a vane rail of a turbine, further depicting a prior art seal there between;

DETAILED DESCRIPTION OF THE INVENTION

The present inventor has recognized several limitations of the conventional seal designs used to seal the gap between the transition and the turbine of a gas turbine engine. As discussed above, the heavy seal design has an inherently large mass/inertia. The conventional heavy seal design lacks an acoustic dampening structure, thereby rendering it susceptible to resonant vibration at an audio resonance frequency. Thus, when a heavy seal design is acoustically excited during the operation of the gas turbine engine, the seal may cause excessive wear to the adjacent components, such as to the transition exit frame and/or the vane rail of the row 1 vane segment. This excessive abrasion with adjacent components may cause excessive wear to the heavy seal surface, and thus the heavy seal surface may fail to reach an expected life target. Similarly, regarding the conventional thin seal design, despite having an inherently small mass/inertia which reduces the likelihood of excessive wear to adjacent components discussed above, the thin seal design also lacks an acoustic dampening structure, and thus is also susceptible to a resonant vibration at an audio resonance frequency. When the thin seal is excited at such a resonance frequency, it may undergo excessive wear with the vane rail of the row 1 vane segment, which is further compounded by direct abrasion with an inherently hard superalloy material used to form the row 1 vane segment.

Thus, the present inventor has developed a system for sealing the gap between the transition and the turbine which extends the expected life targets of the seal surfaces and the surfaces of adjacent components. The present inventors have proposed that the system will include a seal with an acoustical dampening structure to avoid excessive vibration of the seal at an audio resonance frequency. The acoustical dampening structure ensures that the seal avoids resonant vibration during the operation of the gas turbine engine, and accommodates axial and/or radial relative movement in the gap between the transition and the turbine, such as based on component growth variances due to thermal expansion, thermal stresses, and vibrational forces from combustion dynamics. Additionally, the present inventors have proposed that the system may include an intermediate wear surface which is interposed between the seal surface and the vane rail of the row 1 vane segment, such that the seal surface will avoid direct abrasive contact with the inherently hard material used to form the vane rail, thereby further extending the expected target life of the seal surface.

Figure 1:
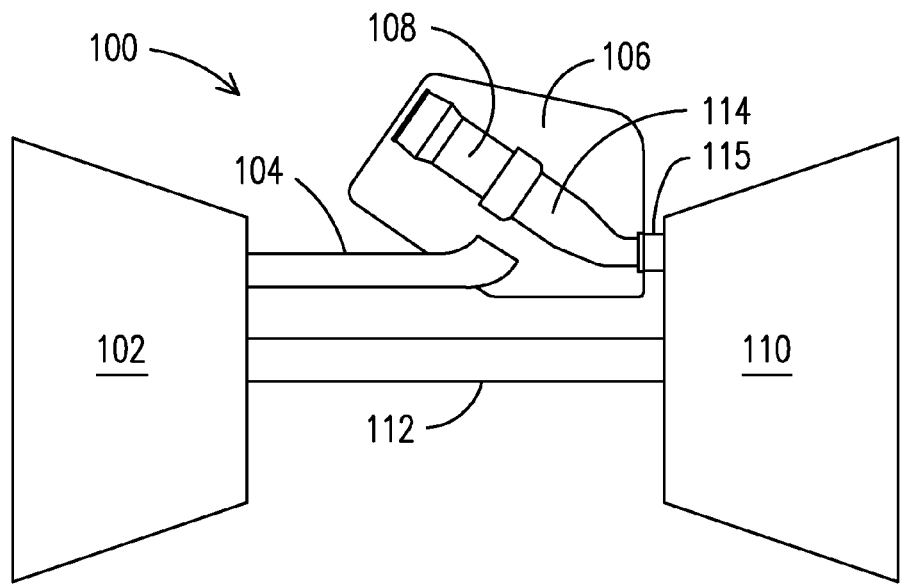
FIG. 1 is a schematic cross-sectional depiction of a prior art gas turbine engine.
Figure 2:
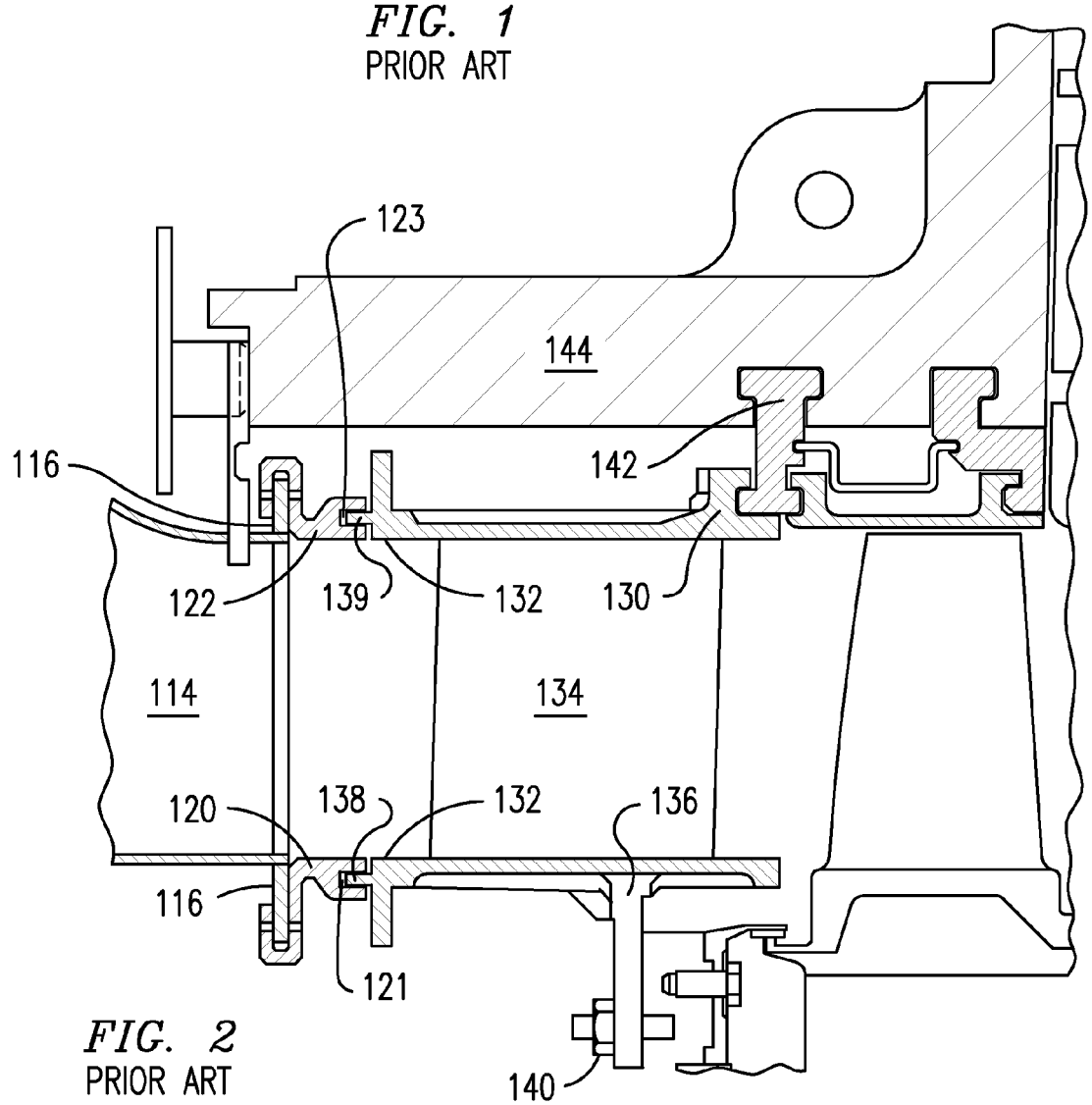
Figure 3:
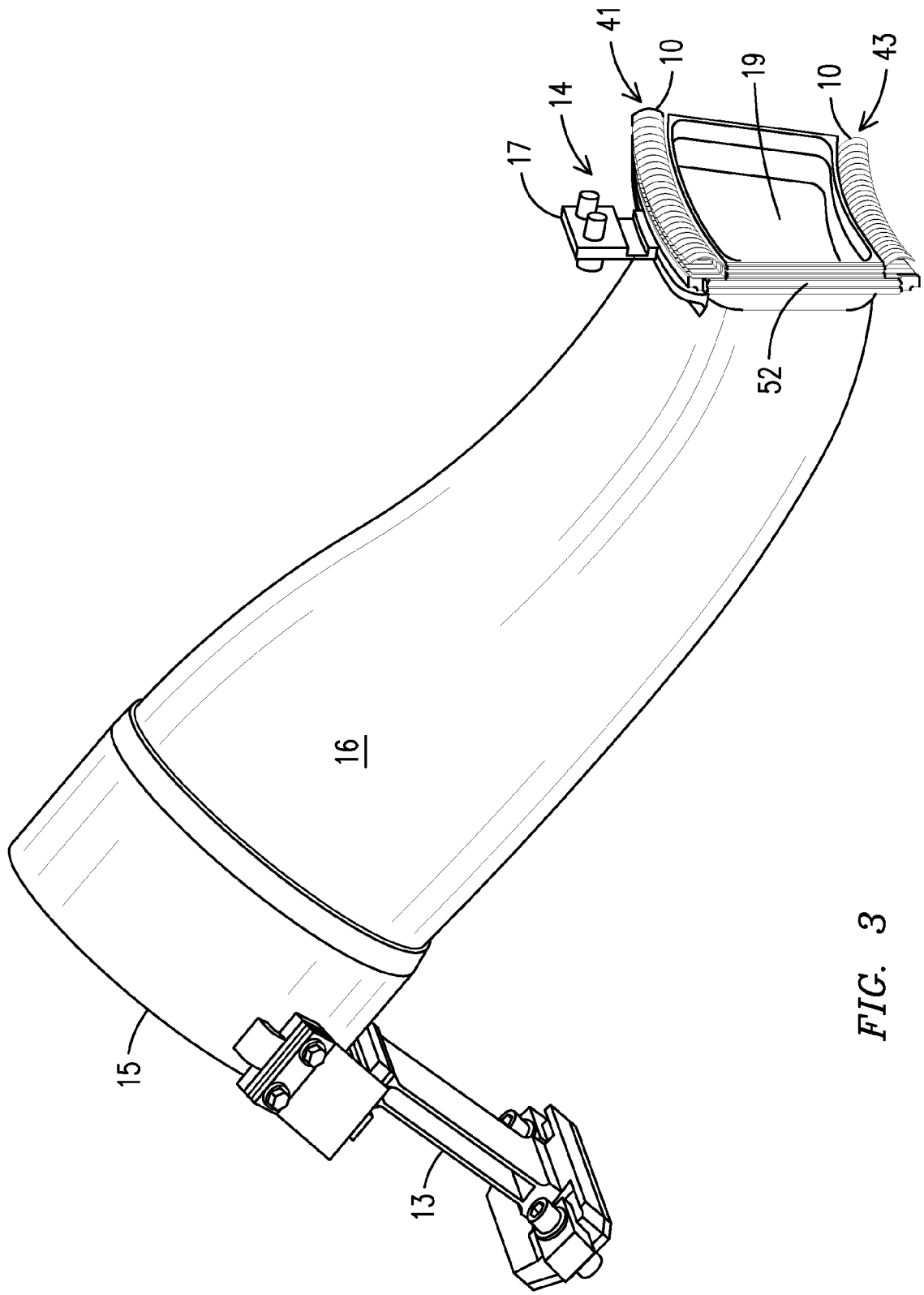
FIG. 3 is an isolated perspective view of a transition and a seal affixed to the exit frame of the transition in accordance with an aspect of the present invention.

FIG. 3 illustrates a transition 16 of a gas turbine engine (not shown) including an inlet 15 mounted to an outlet of a combustor (not shown) of the turbine engine to receive combusted gas, and an outlet 19 mounted to an inlet 20 (FIG. 4) of the turbine, to pass the combusted gas into the turbine. As discussed above, a transition 16 is provided for each of a plurality of combustor outlets, which are arranged radially about a longitudinal axis of the gas turbine engine. A mounting mechanism 13, 17 is provided at opposite ends of the transition 16, to mount the ends of the transition 16 to the gas turbine engine, as appreciated by one of skill in the art. Additionally, the cross-section of the transition 16 varies from a circular cross-section at the inlet 15 to an annular-segment cross-section at the outlet 19, as appreciated by one of skill in the art. The transition outlet 19 of each transition 16 forms a portion of an annular inflow of hot gas to the turbine. In an exemplary embodiment, a gas turbine engine may be provided with sixteen transitions, to respectively couple sixteen individual combustor outlets to sixteen individual turbine inlets, as appreciated by one of skill in the art. Although the embodiments of the present invention below discuss a system used for sealing a gap between a single transition and a single turbine inlet, the system may be utilized for more than one transition, or all transitions within a gas turbine engine.

Figure 4:
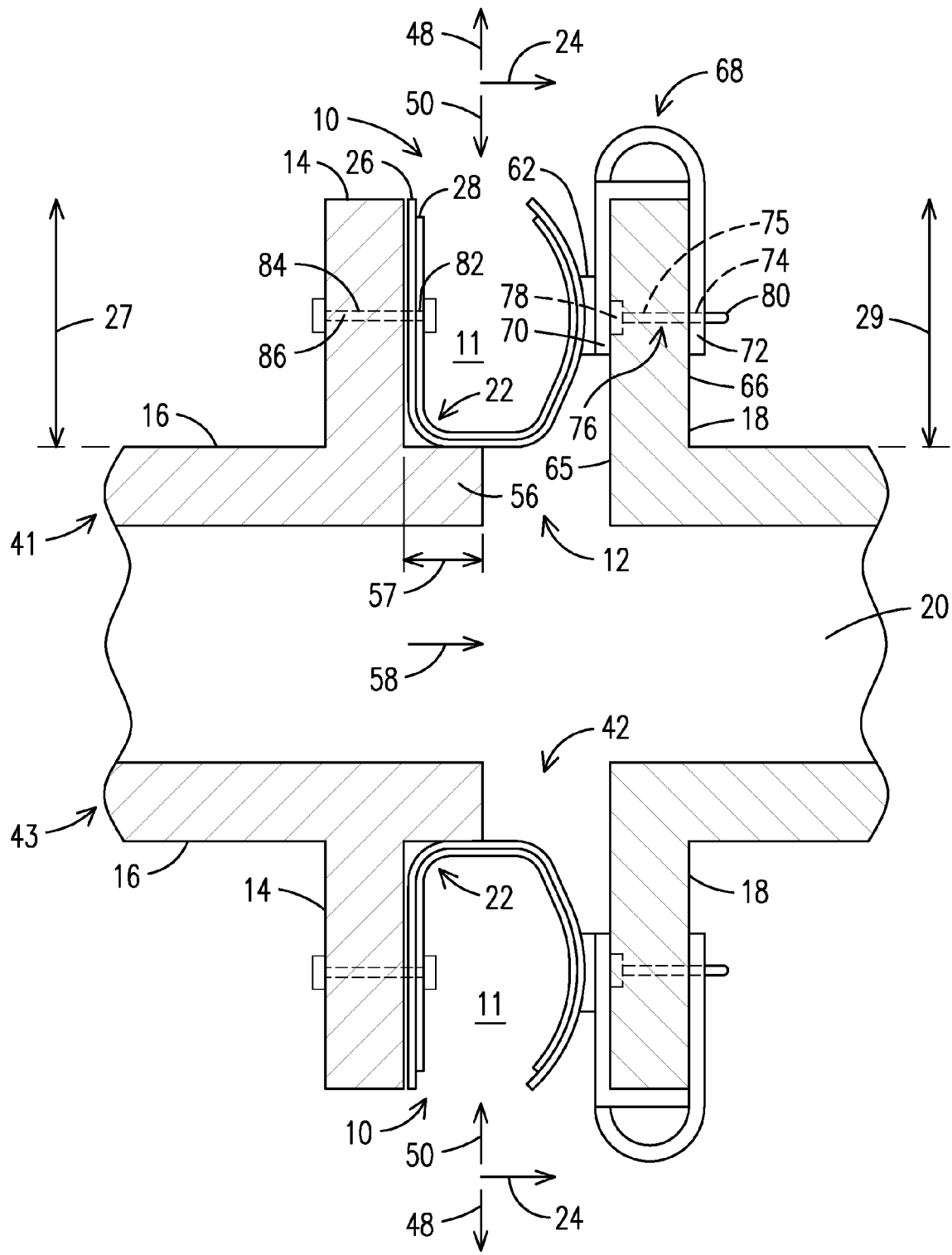
FIG. 4 is a cross-sectional view of the seal between the transition exit frame of FIG. 3 and a vane rail of a turbine inlet in accordance with an aspect of the present invention.

FIG. 4 illustrates a system 10 for sealing a gap 12 between an exit frame 14 of the transition 16 and a vane rail 18 at the inlet 20 or row 1 vane segment of the turbine (not shown). A system 10 is provided for sealing the gap 12 between an outer diameter section 41 of the exit frame 14 and the vane rail 18. Additionally, a system 10 is provided for sealing the gap 42 between an inner diameter section 43 of the exit frame 14 and the vane rail 18. Although the description below discusses the system 10 and the seal 11 used within the gap 12 of the outer diameter section 41, the system 10 and the seal 11 used within the gap 42 of the inner diameter section 43 have an equivalent structure. Although FIG. 4 illustrates that the exit frame 14 of the transition 16 has a T-shaped cross-section and the vane rail 18 at the inlet 20 of the turbine has an L-shaped cross-section, the embodiments of the present invention is not limited to any particular exit frame or vane rail configuration and may be adjusted to be used with any combination of exit frame-vane rail configurations, provided that the seal structure may be secured within the gap 12,42, in the manner discussed in the embodiments below.

As illustrated in FIG. 4, the system 10 includes the seal 11 with a compliant seal member having a generally u-shaped profile 22. Although FIG. 4 illustrates that the seal 11 has a generally u-shaped profile, the seal need not have such a profile and may have any shaped profile, provided that the profile provides adequate vibrational dampening within the gap, as discussed in greater detail below. The seal 11 provides a sealing function with a freedom of movement in an axial direction 24 between the exit frame 14 and the vane rail 18. Pressurized air 50 from the compressor (not shown) is external to the transition 16 and the seal 11 is used to seal this compressed air from passing into the transition 16 and into the turbine inlet 20, thereby bypassing the combustor. As appreciated by one of skill in the art, a permissible amount of compressed air 50 from the compressor may be permitted to enter the transition 16, to provide a cooling effect on the row 1 vane within the turbine, but the seal 11 is designed to prevent more than the permissible amount of compressed air 50 to enter the transition 16.

Figure 6:
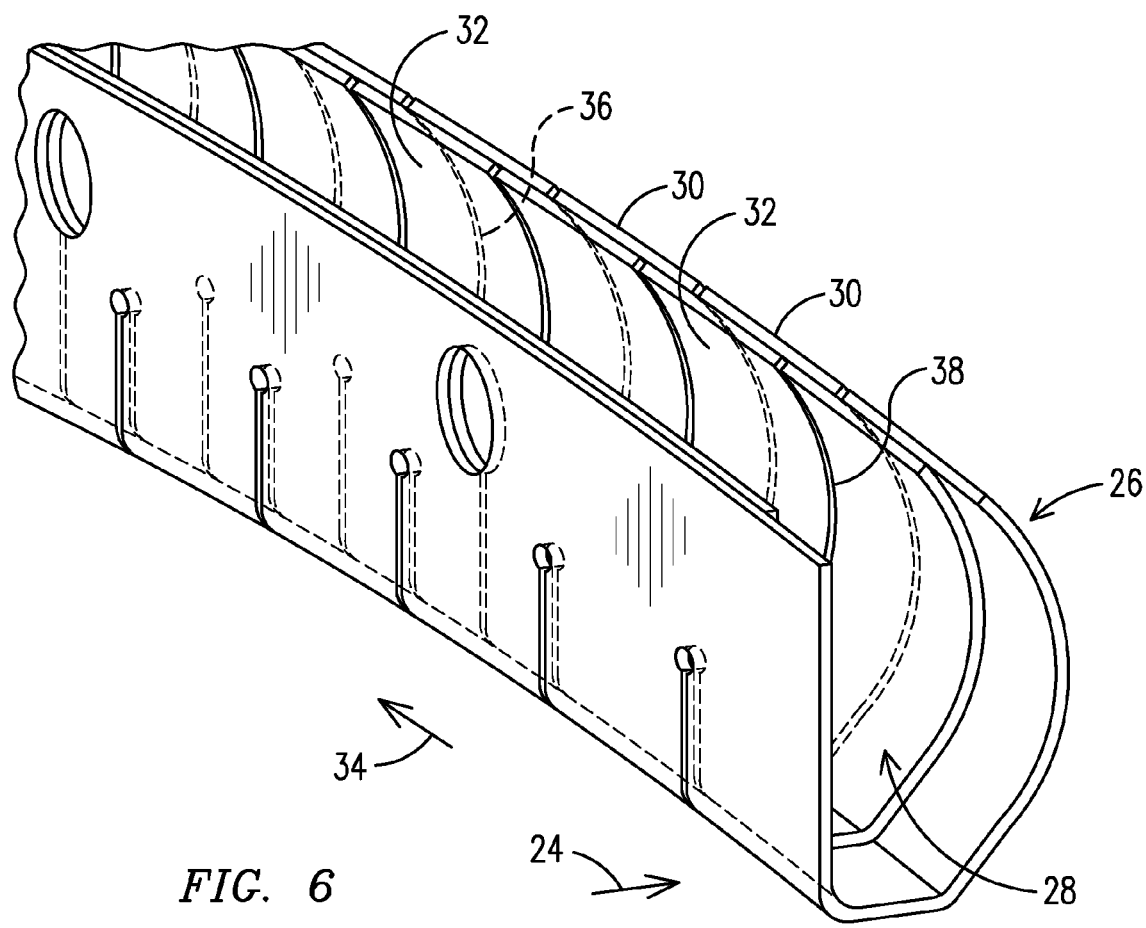
FIG. 6 is an isolated perspective view of the seal illustrated in FIG. 5.

As illustrated in FIGS. 4 and 6, the compliant seal member includes a U-shaped outer sheet 26 and a U-shaped inner sheet 28 securely pressed within the outer sheet 26. The outer sheet 26 and the inner sheet 28 respectively include spaced-apart segments 30, 32 in a lateral direction 34 generally perpendicular to the axial direction 24. By varying the number of segments (and correspondingly varying the width of each segment), the dampening effect of the seal 11 is correspondingly varied. However, the relative friction between the two sheets 26, 28 has a greater impact on the dampening effect of the seal 11 than varying the number of segments 30, 32. Additionally, by increasing an arc length of the outer and inner sheet 26, 28 (i.e., the length along which the sheets 26,28 are rounded into the U-shaped profile 22), the flexibility of the seal 11 is enhanced, which in turn increases the dampening effect of the seal 11, as the length of the sheet 26,28 surfaces subject to relative friction is increased. In an exemplary embodiment of the present invention, the arc length of the sheets 26, 28 is maximized, for a particular radial depth 27, 29 of the respective faces of the exit frame 14 and the vane rail 18. Additionally, the thickness of the inner and outer sheets 26, 28 may be adjusted, to vary the stiffness of the seal 11. The thickness of the inner and outer sheets 26, 28 should be small enough to provide maximum flexibility to the seal 11 against large axial deflection required to seal the gap 12, while also being large enough that the seal 11 will be wear tolerant and/or robust enough during installation/handling of the seal 11 in the gap 12. In an exemplary embodiment, the thickness of each of the sheets 26, 28 may be in a range of 0.5-0.75 mm, for example.

Based on the design parameters of the sheets 26, 28 discussed above, such as the segments 30,32, and the arc length of the sheets 26, 28, a greater flexibility may be afforded when selecting a material to form the sheets 26, 28, while still achieving at least a minimum level of dampening for the seal 11. For example, a more robust material may be chosen to form the sheets 26, 28, provided that the design parameters of the sheets 26, 28 sufficiently enhance the dampening capability of the seal 11 structure. The respective slots 36, 38 of the outer sheet 26 and the inner sheet 28 are misaligned when the inner sheet 28 is securely pressed within the outer sheet 26, such that air is blocked from passing through the outer sheet 26 and/or inner sheet 28. However, the dimensions of the slots 36, 38 may be adjusted to permit a small degree of air to pass through the sheets 26,28, as discussed above. As appreciated by one of skill in the art, the compressed air external to the transition 16 is cooler than the combusted air within the transition 16. Additionally, the dimensions of the slots 36,38 may be sized to control the amount of air flow through the sheets 26,28, such that the flow of compressed air from outside the transition 16 is controlled in a predictable manner. The spaced-apart segments 30, 32 of the outer sheet 26 and inner sheet 28 may form a structure of overlapping fingers which are directly attached to the exit frame 14, and are adapted for sliding axial and/or radial contact with the wear resistant material 62 or with the vane rail 18, if the vane rail 18 is formed from a wear resistant material or a wear resistant material is incorporated into the vane rail 18 structure.

The seal 11 is provided with an acoustical dampening structure, such that any resonance of the seal 11 which may be excited is effectively damped. Each of the sheets 26,28 has a series of natural structural frequencies (i.e., modal frequencies), but the composite structure of both sheets 26,28 in intimate contact will serve to dampen any natural structural frequency that may be excited. The outer sheet 26 and the inner sheet 28 are selected/sized such that internal friction between the outer sheet 26 and the inner sheet 28, when the sheets 26,28 are pressed together, provides an internal dampening of an audio resonance of the seal 11 during operation of the gas turbine engine. The outer sheet 26 and the inner sheet 28 are partially fixed relative to one another, where the sheets 26,28 are fixed together on a side of the seal 11 in contact with the exit frame 14, such as using one or more spot welds or through bolts, for example, and the sheets 26,28 are not securely fixed relative to one another on an opposite side of the seal 11 in contact with the resistant material 62 and are free to engage in internal relative motion and friction with respect to one another. In an exemplary embodiment, the seal 11 provides a high degree of dampening within the gap 12 from axial and/or radial relative movement between the exit frame 14 and the vane rail 18. A length of the seal 11 in a lateral direction 34 is maximized so that the stiffness of the seal 11 is minimized, thus resulting in a lower force required for compression of the seal 11, and also lower stresses in the seal 11. The length of the seal 11 in the lateral direction 34 may be limited, so that the minimum acoustical resonance frequency of the seal 11 is increased to a frequency above the vibration frequencies experienced by the seal 11 during an operation of the gas turbine engine, for example. Additionally, the seal 11 provides a high degree of deflection capability within the gap 12, such that in the event that the exit frame 14 and the vane rail 18 are not centered at an initial axial location, and during a transient operation while the engine approaches an operating condition while the gap 12 dimensions change with time, the seal 11 will nevertheless maintain an air seal within the gap 12.

Figure 5:
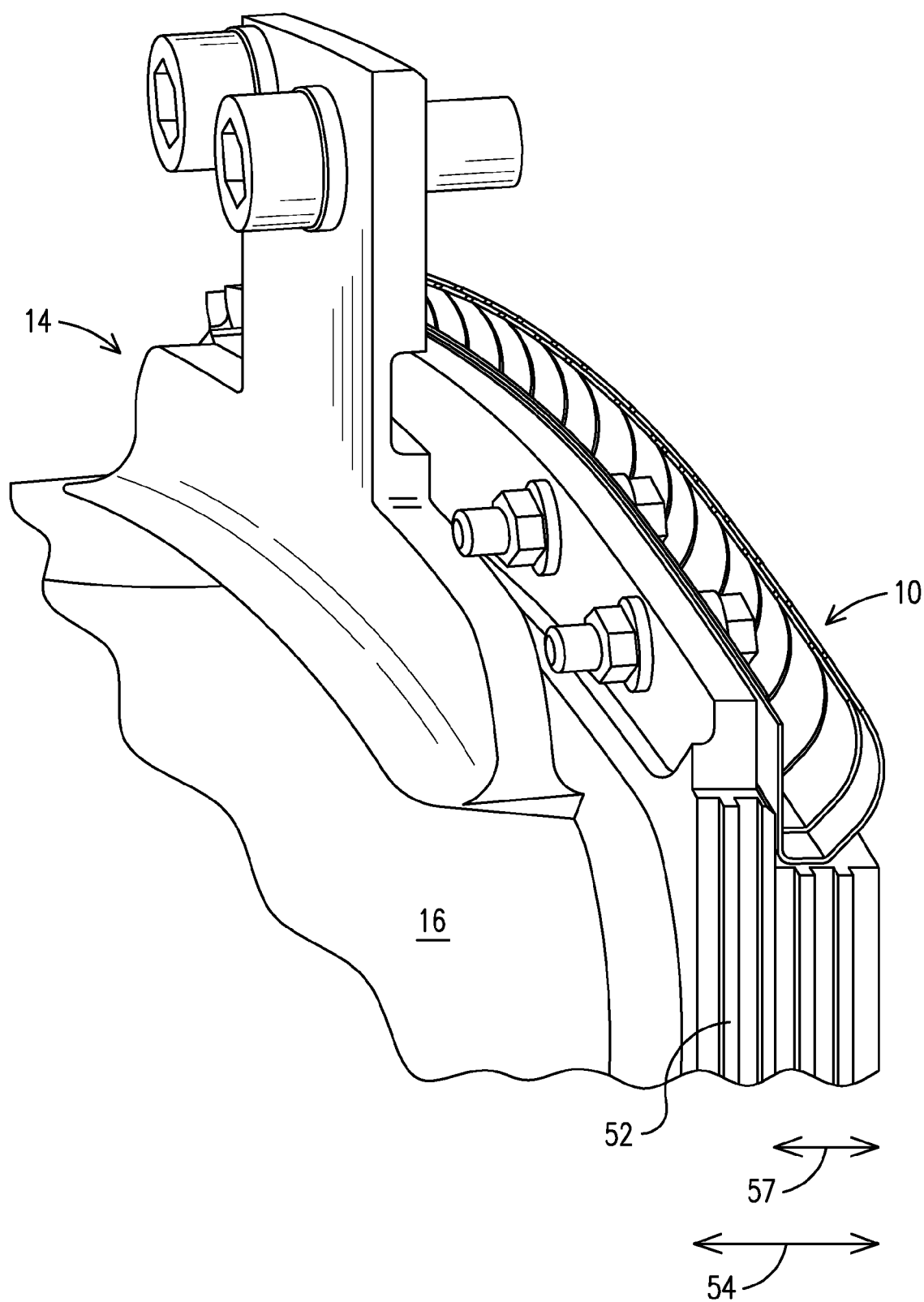
FIG. 5 is a partial rear perspective view of the seal affixed to the transition exit frame illustrated in FIG. 3.

As illustrated in FIG. 4, to position the seal 11 within the system 10, an open end of the u-shaped profile 22 is oriented in an outer radial direction 48 such that compressed air 50 external to the transition 16 pressurizes and expands the seal 11 within the gap 12. Additionally, the compressed air 50 serves to compress the outer and inner sheets 26,28 together, thus improving the dampening capability of the seal 11. In addition to positioning the seal 11 within the gap 12 along the outer diameter section 41 of the exit frame 14, a seal 11 is also positioned within the gap 42 along the inner diameter section 43 of the exit frame 14. As with the seal 11 positioned within the gap 12, the seal 11 positioned within the gap 42 is oriented in the outer radial direction 48 (although in an opposite direction as the seal 11 in the gap 12) such that compressed air 50 external to the transition 16 pressurizes and expands the seal 11 within the gap 42 and compresses the outer and inner sheets 26,28 of the seal 11 together. In an exemplary embodiment, the compressed air 50 external to the transition 16 has a pressure which may be 10 PSI greater than the air within the transition 16, and thus the compressed air 50 expands each seal 11 within its respective gap 12,42, to provide a more effective seal:

As illustrated in FIG. 3, in addition to the seals 11 provided along the inner diameter region 43 and the outer diameter region 41 of the exit frame 14 within the gap 12, a side seal 52 is provided along the side regions of the transition exit frame 14, to prevent combusted air from passing between adjacent transitions. Such side seals may include a plurality of ribs which fit between the ribs of the side seal of an adjacent transition exit frame, to create a tortuous path for combusted air attempting to pass between adjacent transitions, as appreciated by one of skill in the art. Such side seals may include two ribs in one embodiment, three ribs in another embodiment, or four ribs in another embodiment, for example, as more ribs provide a more tortuous path for uncombusted air between adjacent transitions. FIG. 5 illustrates the side seal 52 with an arrangement of four ribs with a total axial width 54, including an increased width 57 showing the width difference from a two ribs side seal arrangement to a four ribs side seal arrangement. As illustrated in FIG. 4, the increased width 57 of the side seal 52 to four ribs provides the exit frame 14 of the transition 16 with a flange 56 which extends axially to provide a partial barrier between the compliant seal member and a hot gas path 58 within the transition 16. As appreciated by one of skill in the art, the combusted gas within the transition 16 which passes into the turbine inlet 20 is heated to temperatures in excess of 2800° F., and could damage the seal 11 positioned within the gap 12, if a sustained or momentary ingress of hot gas 58 were to enter the gap 12. Furthermore, the flange 56 shields the seal 11 from radiation heat loading from the combustion gas passing through the gas path 58 by blocking a substantial portion of the line of sight between the seal 11 and the gas path 58. Thus, the flange 56 advantageously provides a partial barrier between the seal 11 and the hot gas path 58 within the transition 16. As illustrated in FIG. 5, the flange 56 is structurally based on the increased width 57 of the side seal 52 due to the modification from the 2 "ribs" structure side seal to the four "ribs" structure side seal. Although FIGS. 4-5 illustrate that a side seal with a 4-rib side seal structure provides the exit frame with a flange to provide a partial-axial barrier to a hot gas path, the exit frame may be provided with the flange irrespective of the particular structure of the side seal.

Figure 8:
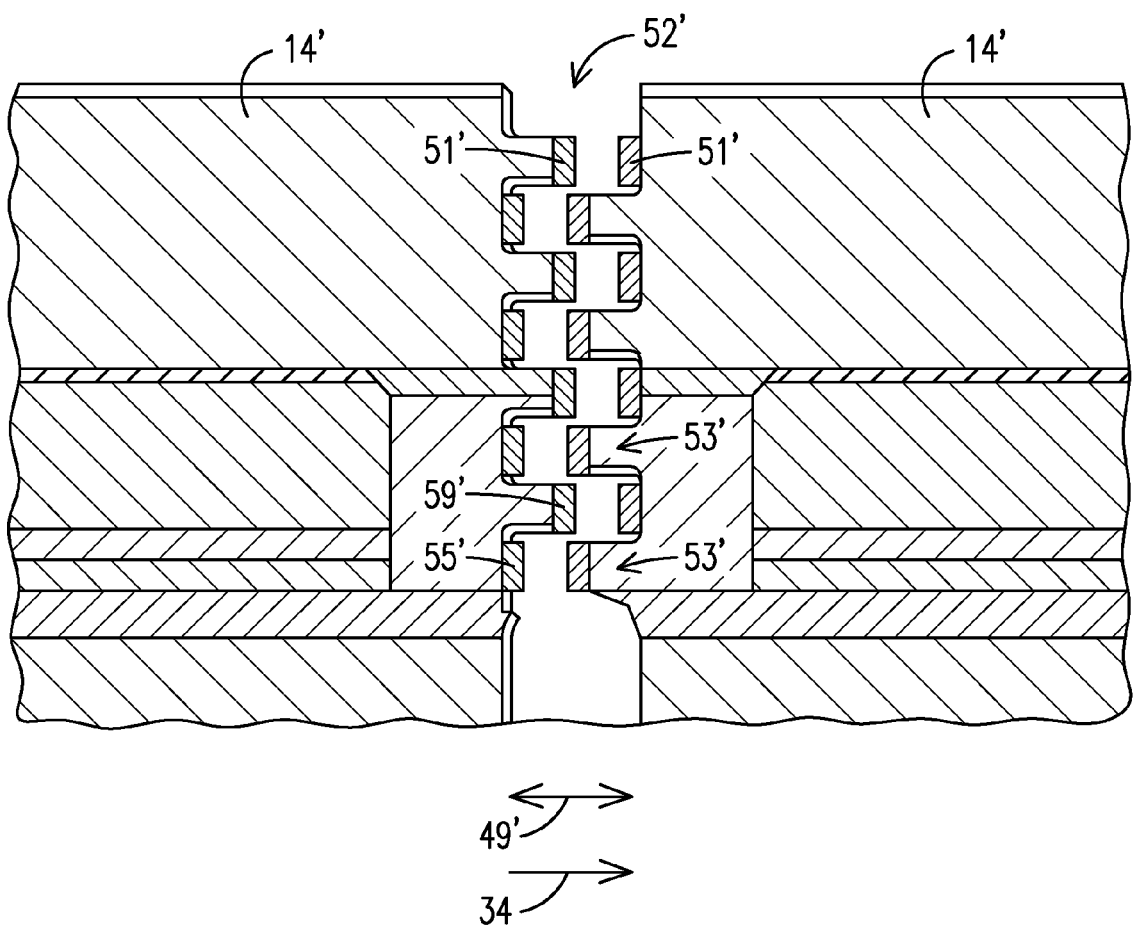
FIG. 8 is a cross-sectional view of a side seal between adjacent transition exit frames in accordance with an aspect of the present invention.

As illustrated in FIG. 8, another embodiment provides a side seal 52' along the side regions of adjacent transition exit frames 14', to seal a lateral gap 49' oriented in the lateral direction 34. A crushable material 51' is disposed within a labyrinth defined between the ribs 53' of the side seal 52'. As illustrated in FIG. 8, the crushable material 51' is disposed on valleys 55' and tips 59' of the ribs 53' of the labyrinth. Although FIG. 8 illustrates that the crushable material 51' is disposed on the valleys 55' and tips 59' of the ribs 53' of the labyrinth, the crushable material 51' may be disposed on either of the valleys 55' or the tips 59' or both, and need not be disposed on both the valleys 55' and the tips 59', and need not be disposed on every valley and tip. In an exemplary embodiment, the crushable material 51' is a metal spray material made from chopped metal fibers, for example. The crushable material 51' disposed within the labyrinth is configured to adapt to thermal distortion and thermal bowing of the adjacent transition exit frames 14', in order to maintain a minimum gap within the labyrinth between the ribs 53' and thereby prevent combusted air from passing through the lateral gap 49' between the adjacent transitions 14'.

The material used to form the vane rail 18 is an inherently hard material, such as a superalloy material, for example, as appreciated by one of skill in the art, which may cause excessive wear to the seal 11 surface, based on the axial and/or radial relative movement between the vane rail 18 and the exit frame 14 during the operation of the gas turbine engine. Thus, the embodiments of the present invention provide a wear resistant material 62 between the seal 11 surface and the vane rail 18 surface, such that direct abrasive contact between the seal 11 surface and the vane rail 18 surface is avoided, thereby extending the expected life of the seal 11 surface. As illustrated in FIG. 4, the system 10 includes a wear resistant material 62 interposed between the seal 11 and the vane rail 18 of the turbine inlet 20. More specifically, the system 10 includes a support member or clip 68 with a first leg 70 and a second leg 72 having an opening 74. Additionally, the system 10 includes a pin 76 with a head 78 to be retained within an opening 75 in the vane rail 18 by the first leg 70, and a tail 80 to pass through the opening 74 in the second leg 72 of the clip 68. Thus, the opening 75 in the vane rail 18 is shaped to fit the exterior surface of the pin 76, with a larger width on a side 65 of the vane rail 18 adjacent to the region 12 than a side 66 of the vane rail 18 opposite to the region 12. The pin 76 is retained within the opening 75 in the vane rail 18 by positioning the clip 68 around the vane rail 18. A mechanical interface between the pin 76 and the clip 68 is provided which retains the clip 68 on the vane rail 18. The mechanical interface is disposed on the side 66 of the vane rail 18 opposite to the region 12 and, in the embodiment discussed above, the mechanical interface involves the tail 80 of the pin being secured through the opening 74 in the second leg 72 of the clip 68 on the side 66 of the vane rail 18. Since the mechanical interface between the pin 76 and the clip 68 is disposed on the side 66 opposite to the region 12, the interface is not vulnerable to the temperature conditions within the region 12, such as a momentary ingress of hot gas 58 into the region 12 from the transition 16, for example. Although FIG. 4 illustrates that the wear resistant material 62 is supported on the side 66 of the vane rail 18 opposite to the region 12 using the mechanical interface of the pin 76 and the clip 68, the wear resistant material 62 may be attached to any type of support member, which is attached to the side 66 of the vane rail 18 opposite to the region 12. Additionally, although FIG. 4 illustrates that the wear resistant material 62 is supported on the side 66 of the vane rail 18, the embodiments of the present invention is not limited to this arrangement, and may involve brazing the wear resistant material 62 directly to the side 65 of the vane rail 18 within the region 12, without the need for a clip 68. In such an embodiment, after the wear resistant material 62 has worn down beyond a threshold thickness, it may be removed from the side 65 of the vane rail 18 and replaced with another piece of wear resistant material 62.

Figure 7:
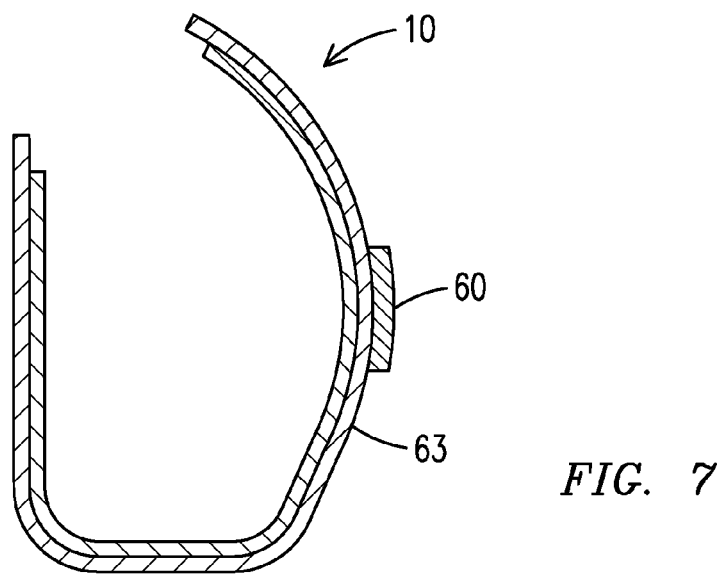
FIG. 7 is an isolated cross-sectional side view of an alternate seal with a strip of anti-wear material affixed to an exterior surface of the seal in accordance with an aspect of the present invention.

In an alternate embodiment in which the wear resistant material is interposed between the seal 11 and the vane rail 18 of the turbine inlet 20, the wear resistant material may be attached to the seal 11 itself, rather than to the vane rail 18. As illustrated in FIG. 7, a strip 60 of the wear resistant material is attached to an outer surface 63 of the seal 11 configured to engage the vane rail 18. In an exemplary embodiment, the strip 60 of the wear resistant material may be a cobalt alloy material, such as Haynes 25, for example. The strip 60 of the wear resistant material may be brazed or welded onto the surface 63, and may be replaceable if the strip 60 wears down below a threshold thickness, such that that the seal 11 surface avoids excessive wear against the vane rail 18 surface. In an additional alternate embodiment, the wear resistant material may be applied in the form of a wear resistant coating that is added to the surface 63 of the seal 11, the vane rail 18, or both surfaces. The wear resistant coating may be made from chromium carbide, Stellite® alloy, Tribaloy® alloy, or any one of many such coatings known to one of skill in the art, for example.

As further illustrated in FIG. 4, the seal 11 is directly attached to the transition exit frame 14. More specifically, the seal 11 and the exit frame 14 include a respective opening 82,84 through which a pin 86 is passed and is secured within the openings 82,84 using bolts, for example, to secure the seal 11 to the exit frame 14. However, the seal 11 need not be directly attached to the exit frame 14 and may be indirectly attached to the exit frame 14 through an intermediate surface, for example.

In addition to the system 10 discussed above, an embodiment of the present invention may embody a kit which is used to seal the gap 12 within a pre-existing turbine engine. The kit would include the seal 11 with the compliant seal member having the generally u-shaped profile 22, to provide the sealing function with the freedom of movement in the axial direction 24 within the existing gap 12. Additionally, the kit may optionally include the wear resistant material 62 interposed between the seal 11 and the vane rail 18. The kit may also include mounting hardware, such as the clip 68, for example, where the wear resistant material 62 would be attached the mounting hardware within the gap 12 and the mounting hardware would be attached to the side 66 of the vane rail 18 opposite to the gap 12. The kit may be used to seal the gap 12 between the outer diameter section 41 of the exit frame 14 and the vane rail 18, as well as the gap 42 between the inner diameter section 43 of the exit frame 14 and the vane rail 18.

Although the embodiments of the present invention discuss the combination of the seal 11 and the wear resistant material 62 interposed between the seal 11 and the vane rail 18, the embodiments of the present invention need not include the seal 11 discussed above, and may just include the wear resistant material 62 interposed between a seal within the gap 12 and the vane rail 18, where the wear resistant material 62 is attached to a support member, such as the clip 68, and the support member is attached to the side 66 of the vane rail 18 opposite to the gap 12.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for sealing a gap between an exit frame of a transition and a vane rail at an inlet of a turbine, said system comprising:
   a seal including a compliant seal member comprising a generally U-shaped profile to provide a sealing function with a freedom of movement in an axial direction between the exit frame and the vane rail;
   a clip including a first leg and a second leg with an opening; and
   a pin comprising a head to be retained within a through-opening in the vane rail by the first leg and a tail passing through the opening in the clip;
   wherein the seal is directly attached to the exit frame;

wherein the U-shaped profile of the compliant seal member comprises a U-shaped outer sheet and a U-shaped inner sheet securely pressed within the outer sheet, said outer sheet and said inner sheet respectively comprising a plurality of spaced-apart segments in a lateral direction generally perpendicular to the axial direction, said segments being spaced-apart by respective slots in the outer sheet and the inner sheet;

wherein said respective slots of the outer sheet and the inner sheet are misaligned when the inner sheet is securely pressed within the outer sheet to block passage of air there through;

wherein friction between the outer sheet and the inner sheet provides dampening of an audio resonance of the seal;

wherein an open end of the U-shaped profile is oriented in an outer radial direction.

2. The system of claim 1, wherein an arc length of the U-shaped inner sheet is less than an arc length of the U-shaped outer sheet.

3. The system of claim 1, wherein said exit frame comprises a flange extending axially to provide a partial barrier between the compliant seal member and a hot gas path.

4. The system of claim 1, further comprising a wear resistant material interposed between the seal and the first leg.

5. The system of claim 4, wherein the wear resistant material is a wear resistant coating deposited on at least one of the seal and the first leg.

6. The system of claim 4, wherein a strip of the wear resistant material is attached to an outer surface of the seal configured to engage the first leg.

7. The system of claim 4,
wherein a mechanical interface between the pin and the clip includes the tail passing through the opening in the clip, wherein the mechanical interface retains the clip on the vane rail and is disposed on a side of the vane rail opposite to the gap.

8. The system of claim 4, wherein the wear resistant material is attached to the first leg.

9. The system of claim 1, wherein the seal and the exit frame include a respective opening and wherein a bolt is passed through the respective opening in the seal and the exit frame to secure the seal to the exit frame.

10. The system of claim 1, wherein said exit frame comprises a side seal to seal a lateral gap in the lateral direction between the exit frame of the transition and an exit frame of an adjacent transition; wherein a labyrinth is formed between a plurality of ribs of said side seal; and wherein a crushable material is disposed within the labyrinth between the transition and the adjacent transition.

11. The system of claim 10, wherein the plurality of ribs defines valleys and tips; and wherein the crushable material is disposed on at least one of a valley and a tip.

12. The system of claim 1, wherein the U-shaped outer sheet and the U-shaped inner sheet are fixed together on a first side of the seal and the U-shaped outer sheet and the U-shaped inner sheet are not securely fixed relative to one another and are free to engage in internal relative motion and friction with respect to one another on a second side of the seal that is opposite to the first side.

13. A system for sealing a gap between an exit frame of a transition and a vane rail at an inlet of a turbine, said system comprising:
a seal including a compliant seal member comprising a generally U-shaped profile to provide a sealing function with a freedom of movement in an axial direction between the exit frame and the vane rail;
a clip including a first leg and a second leg with an opening;
a pin comprising a head to be retained within an opening in the vane rail by the first leg and a tail passing through the opening in the clip; and
a wear resistant material interposed between the seal and the first leg;
wherein the seal is directly attached to the exit frame;
wherein the U-shaped profile of the compliant seal member comprises a U-shaped outer sheet and a U-shaped inner sheet securely pressed within the outer sheet, said outer sheet and said inner sheet respectively comprising a plurality of spaced-apart segments in a lateral direction generally perpendicular to the axial direction, said segments being spaced-apart by respective slots in the outer sheet and the inner sheet;
wherein said respective slots of the outer sheet and the inner sheet are misaligned when the inner sheet is securely pressed within the outer sheet to block passage of air there through;
wherein friction between the outer sheet and the inner sheet provides dampening of an audio resonance of the seal;
wherein an open end of the U-shaped profile is oriented in an outer radial direction.

\* \* \* \* \*